(12) United States Patent
Golding (10) Patent No.: US 11,900,110 B2
(45) Date of Patent: Feb. 13, 2024

(54) INCREASING USER INTERACTION WITH DEEP LEARNING AGENT

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

(*) Notice: Subject to any disclaimer, the term of this patent is extended or adjusted under 35 U.S.C. 154(b) by 397 days.

(21) Appl. No.: 17/207,407

(22) Filed: Mar. 19, 2021

(65) Prior Publication Data

US 2022/0300283 A1     Sep. 22, 2022

(51) Int. Cl.
| | |
|---|---|
| G06F 9/30 | (2018.01) |
| G06K 9/62 | (2022.01) |
| G06F 9/445 | (2018.01) |
| G06N 20/00 | (2019.01) |
| G06F 18/214 | (2023.01) |
| G06F 18/2415 | (2023.01) |

(52) U.S. Cl.
CPC ........ G06F 9/30036 (2013.01); G06F 9/4451 (2013.01); G06F 18/214 (2023.01); G06F 18/2415 (2023.01); G06N 20/00 (2019.01)

(58) Field of Classification Search
None
See application file for complete search history.

(56) References Cited

U.S. PATENT DOCUMENTS

| | | | | |
|---|---|---|---|---|
| 5,619,709 | A * | 4/1997 | Caid | G06F 16/3347 707/E17.08 |
| 9,812,151 | B1 * | 11/2017 | Amini | G06T 13/40 |
| 10,902,298 | B2 * | 1/2021 | Chen | G06F 9/30036 |
| 10,979,369 | B1 * | 4/2021 | Kulkarni | G06N 5/04 |
| 11,068,304 | B2 * | 7/2021 | Li | G06N 7/01 |
| 11,113,745 | B1 * | 9/2021 | Cetintas | G06Q 30/0204 |
| 11,367,120 | B2 * | 6/2022 | Gupta | A63F 13/61 |
| 11,397,786 | B2 * | 7/2022 | Shen | G06F 16/958 |
| 2008/0140644 | A1 * | 6/2008 | Franks | G06F 16/73 707/999.005 |
| 2017/0277790 | A1 * | 9/2017 | Alonso | G06F 16/31 |
| 2018/0329883 | A1 * | 11/2018 | Leidner | G06F 40/30 |
| 2020/0005196 | A1 * | 1/2020 | Cai | G06F 16/9535 |

(Continued)

FOREIGN PATENT DOCUMENTS

WO     WO-2013124521 A1 *   8/2013    ........... G06F 16/334

OTHER PUBLICATIONS

Machine Translation of KR 20190065665 A, 2019. (Year: 2019).*

(Continued)

*Primary Examiner* — Steven G Snyder
(74) *Attorney, Agent, or Firm* — FERGUSON BRASWELL FRASER KUBASTA PC (57) ABSTRACT

A method increases user interaction with deep learning agents. A generation request for a content slot is received. A subsequent tag vector, for the content slot, is generated from a previous tag, for a previous content slot, using a subsequent tag model. A context vector is generated from a set of subsequent tag vectors, which include the subsequent tag vector, using a context vector generator. A selection vector is generated from the context vector using a contextual bandit model. A content set is generated for a content slot using the selection vector. The content set for the content slot is presented.

18 Claims, 7 Drawing Sheets

(56) References Cited

U.S. PATENT DOCUMENTS

| | | | |
|---|---|---|---|
| 2020/0125586 A1* | 4/2020 | Rezaeian | G06F 3/048 |
| 2020/0327577 A1* | 10/2020 | Truong | G06Q 30/0244 |
| 2021/0089959 A1* | 3/2021 | Ghosh | G06N 5/01 |
| 2021/0286810 A1* | 9/2021 | Kim | G06F 16/2438 |
| 2021/0344587 A1* | 11/2021 | Ahmed | H04L 45/08 |
| 2022/0019922 A1* | 1/2022 | Mehrotra | G06N 3/006 |
| 2022/0035692 A1* | 2/2022 | Wang | G06Q 10/04 |
| 2022/0227377 A1* | 7/2022 | Cao | B60H 1/00878 |

OTHER PUBLICATIONS

'Deriving User- and Content-specific Rewards for Contextual Bandits' by Paolo Dragone et al., copyright 2019 IW3C2 (International World Wide Web Conference Committee). (Year: 2019).*

'Greedy Confidence Pursuit: A Pragmatic Approach to Multi-bandit Optimization' by Philip Bachman et al., ECML PKDD 2013 Prague, Czech Republic, Sep. 2013. (Year: 2013).*

'Collaborative Filtering Bandits' by Shuai Li et al., copyright 2016 ACM. (Year: 2016).*

* cited by examiner

INCREASING USER INTERACTION WITH DEEP LEARNING AGENT

BACKGROUND

Computing systems may be used to interact with users with multiple types of communication, including voice communications, email communications, web page communications, etc. A challenge is for computing systems and machine learning systems to identify and use the context of previous communications in subsequent communications.

SUMMARY

In general, in one or more aspects, the disclosure relates to a method that increases user interaction with deep learning agents. A generation request for a content slot is received. A subsequent tag vector, for the content slot, is generated from a previous tag, for a previous content slot, using a subsequent tag model. A context vector is generated from a set of subsequent tag vectors, which include the subsequent tag vector, using a context vector generator. A selection vector is generated from the context vector using a contextual bandit model. A content set is generated for a content slot using the selection vector. The content set for the content slot is presented.

In general, in one or more aspects, the disclosure relates to a system that includes a server and a server application. The server includes one or more processors and one or more memories. The server application executes on one or more processors of the server to increases user interaction with deep learning agents. A generation request for a content slot is received. A subsequent tag vector, for the content slot, is generated from a previous tag, for a previous content slot, using a subsequent tag model. A context vector is generated from a set of subsequent tag vectors, which include the subsequent tag vector, using a context vector generator. A selection vector is generated from the context vector using a contextual bandit model. A content set is generated for a content slot using the selection vector. The content set for the content slot is presented.

In general, in one or more aspects, the disclosure relates to a method that trains a machine learning models. A subsequent tag model is trained to generate subsequent tag vectors from previous tags. Contextual bandit models are trained to each generate selection vectors from context vectors. A subsequent tag vector, for the content slot, is generated from a previous tag, for a previous content slot, using a subsequent tag model. A context vector is generated from a set of subsequent tag vectors, which include the subsequent tag vector, using a context vector generator. A selection vector is generated from the context vector using a contextual bandit model. A content set for a content slot is generated using the selection vector.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms 'before', 'after', 'single', and other such terminology. Rather, the use of ordinal numbers is to distinguish between the elements. By way of an example, a first element is distinct from a second element, and the first element may encompass more than one element and succeed (or precede) the second element in an ordering of elements.

In general, with embodiments of the disclosure, users communicate with a computing system with multiple devices using different forms of communication. Voice communications, email communications, web page communications, as well as other forms of communication, may be used. To increase interaction with the user, computing systems may use deep learning agents that may identify a context for a subsequent communication from the context of previous communications. The context may be identified with tags, which may be string values linked to the communications. The tags may be input to a machine learning model that converts the tags to tag vectors and determines tag vectors for subsequent communications from the tag vectors associated with previous communications. After identifying the tag vectors for subsequent communications, the system may use another machine learning model, contextual bandit model, to identify the content to include in the communications. After identifying the content, the computing system may transmit the content to the user to interact with the user.

A communication between a user and a computing system may form a content slot. A content slot is a particular content set (i.e., a set of content) at a particular step in a sequence of communication between a user and a system. A user may communicate with the system at multiple discrete points in time. A content slot corresponds to the communication between the user in the system at a point in time. A content slot may be stored as a file, a record in a database, a data structure in memory, etc., that includes the content set from the communication with the user (e.g., a voice interaction transcript, an email message, a web page, etc.) and a set of tags that identify the context of the content set for the content slot.

Each content slot may be a particular type, referred to as a content slot type. Content slot types include voice interaction content slots, email interaction content slots, web page interaction content slots, etc. For voice interaction content slots, the system may use a script to autonomously interact with the user. For email interaction content slots, the system may generate emails that are sent to the user. For web interaction content slots, the system may generate web pages in response to users accessing the system with a browser.

Each content set may include multiple content blocks. A content block is a piece of content, such as an image, a sentence of text for an email, text for a voice interaction, etc. The content blocks for a content set may include customized information based on the context of the communication between the user and the system.

A content template is used to identify blocks of content that may be used for a content set. A content template set is a collection of content templates used for a type of content slot. Each content slot may correspond to a content template set and each content template set may include multiple content templates.

Tags are used by the system to identify context of the communications between the system and its users. Each tag may be stored as a string value. Each content slot may be labeled with multiple tags to identify the context of the communication from the content slot. For example, when the content slot is for a voice communication and the user discusses applying for a home equity line of credit (HELOC) to fund remodeling a kitchen, the tags "#heloc" and "#kitchen" may be linked to the content slot. The tags may be converted to tag vectors using machine learning models.

A tag vector is a set of multiple floating point values that identify the location of a tag (a string value) in a vector space. Tag vectors with similar values correspond to tags that have similar meaning.

Figure 1A:
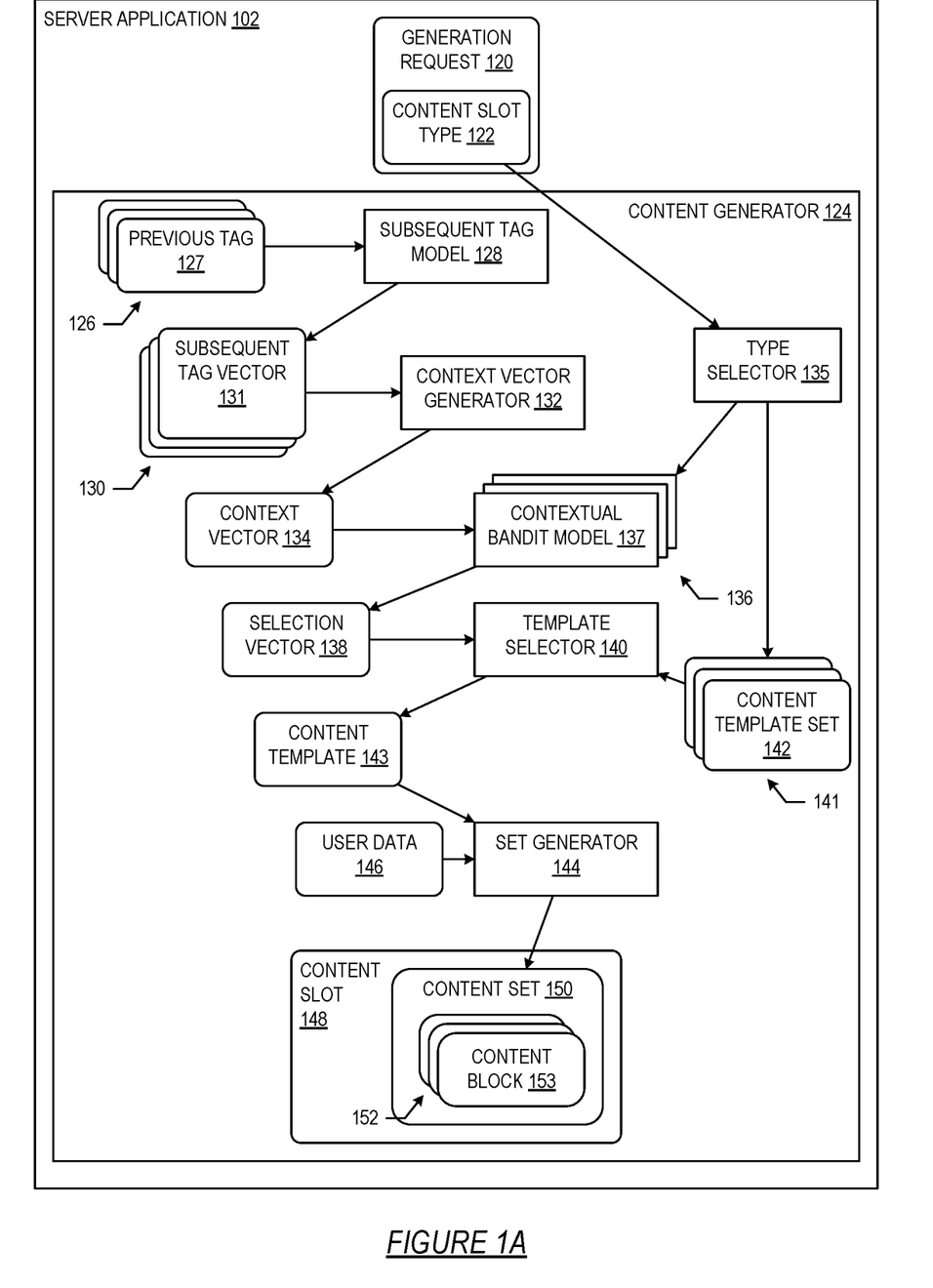
FIG. 1A, FIG. 1B, and FIG. 1C show diagrams of systems in accordance with disclosed embodiments.
Figure 1B:
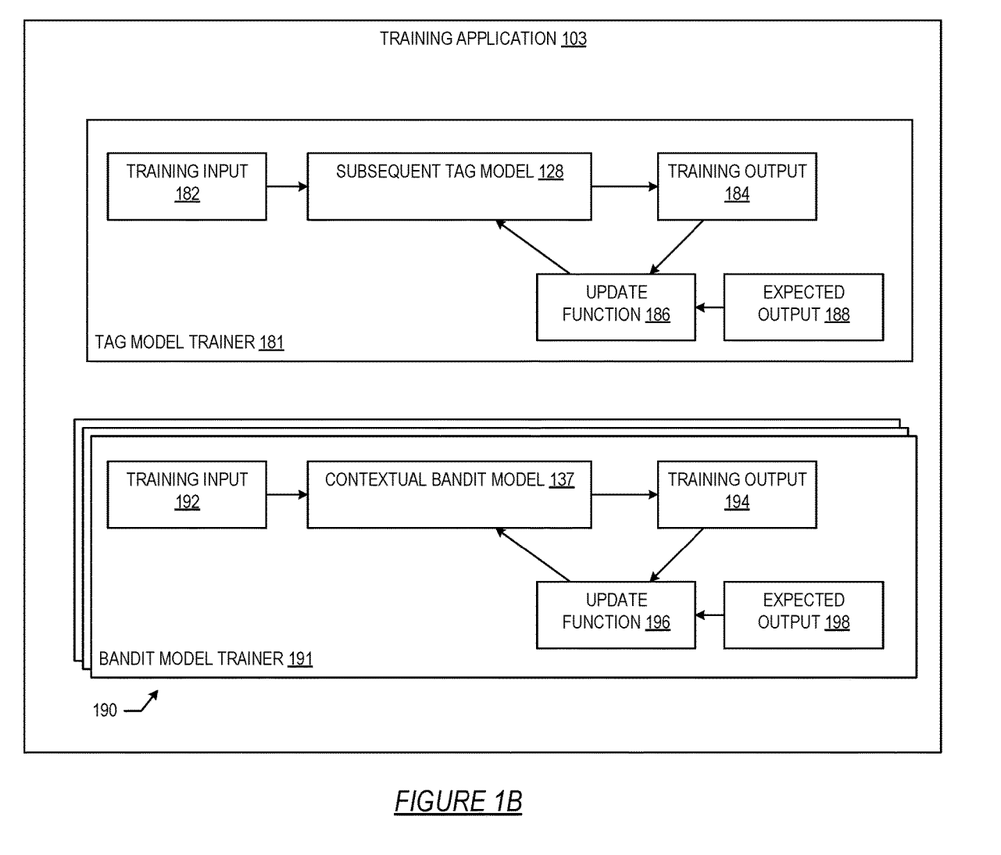
Figure 1C:
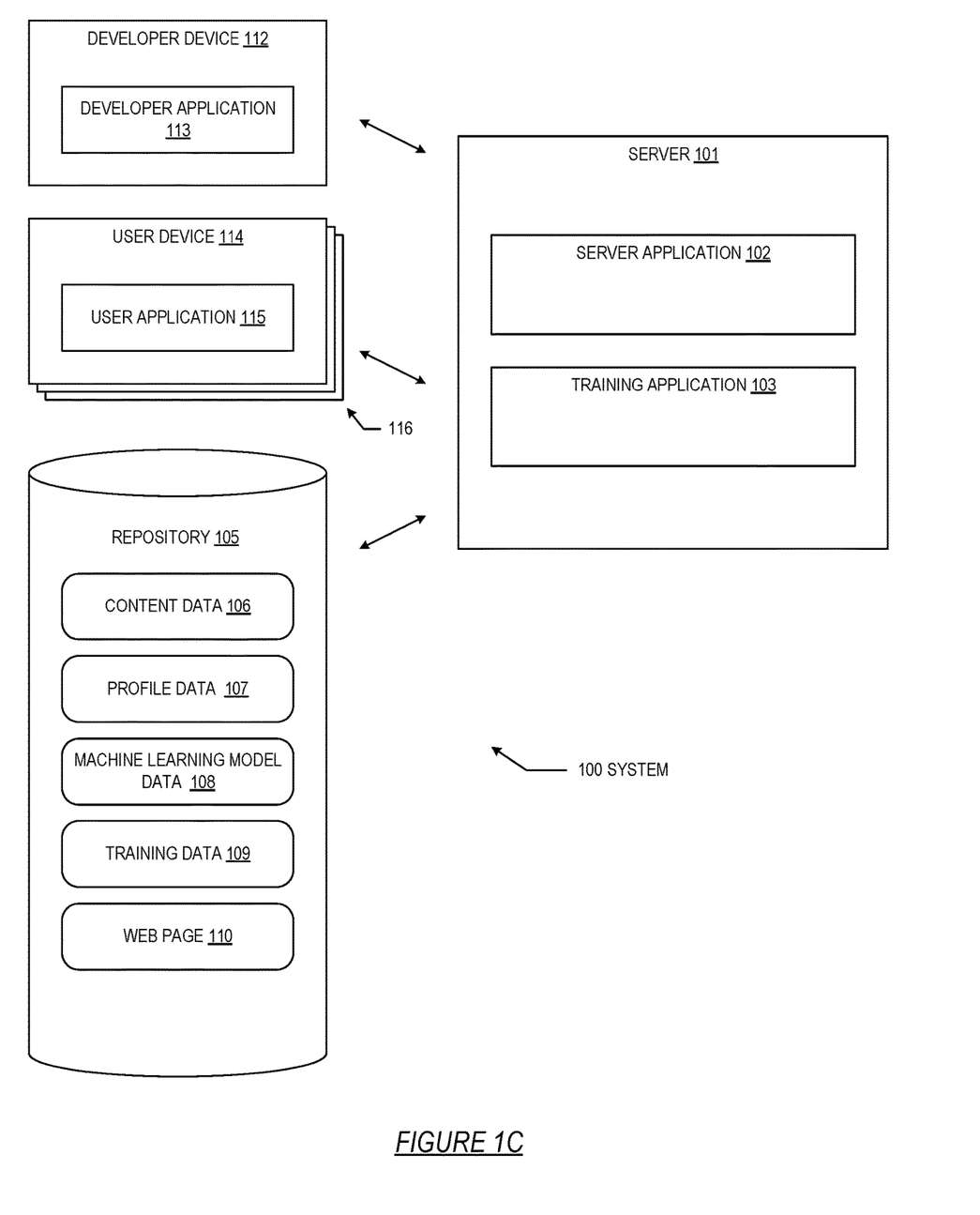

FIGS. 1A, 1B, and 1C show diagrams of embodiments that are in accordance with the disclosure. FIG. 1A shows the server application (102), which uses machine learning models to increase interaction with users. FIG. 1B shows the training application (103), which trains machine learning models. FIG. 1C shows the system (100), which trains and uses machine learning models to increase interaction with users. The embodiments of FIGS. 1A, 1B, and 1C may be combined and may include or be included within the features and embodiments described in the other figures of the application. The features and elements of FIGS. 1A, 1B, and 1C are, individually and as a combination, improvements to the technology of machine learning. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Turning to FIG. 1A, the server application (102) is a set of components (including hardware and/or software) running on the server (101) (of FIG. 1C). The server application (102) uses a deep learning agent to increase user interaction. The server application (102) receives the generation request (120), which includes the content slot type (122). Responsive to the generation request (120), the server application (102) uses the content generator (124) to generate the content set (150) for the content slot (148). The content set (150) may be generated using the content template (143) and the user data (146). The content template (143) may be selected using multiple machine learning models, an example of which is described below.

In one embodiment, the server application (102) receives the generation request (120) in response to interaction with one of the user devices (116) (of FIG. 1C). For example, the user may establish a voice connection the server (101) (e.g., a telephone call). As another example, the user may request to view a website hosted by the server (101) (of FIG. 1C).

In one embodiment, the server application (102) receives the generation request (120) in response to a previous interaction with a user. For example, after ending a voice communication between the server (101) and one of the user devices (116), the server application (102) may send a follow up retargeting email that is received by the user devices (of FIG. 1C).

The content slot type (122) identifies the type of content to generate for the content slot (148). Types of content slots include voice interaction content slots, email interaction content slots, and web page interaction content slots, etc.

The content generator (124) is a component of the server application (102) that generates the content set (150) using the generation request (120), multiple components, and multiple machine learning models. The content generator (124) identifies the previous tags (126), generates the subsequent tag vectors (130), selects the content template set (142), and generates the content blocks (152) of the content set (150). The components of the content generator (124) include the subsequent tag model (128), the context vector generator (132), the type selector (135), the contextual bandit models (136), the template selector (140), and the set generator (144).

The content generator (124) identifies the previous tags (126), which include the previous tag (127). The previous tags (126) are labels that have been assigned to previous content slots, which describe the context or meaning of the information related to the previous content slots. The previous content slots are content slots for communications with a user that were generated and transmitted prior to generating the content slot (148). Each of the previous content slots (126) may have multiple tags that are each included in the previous tags (126).

For example, a previous content slot may be for a voice interaction between a user and the system (100) (of FIG. 1C). The tags for the previous voice interaction content slot may identify the context that was discussed during the voice interaction, such as funding a project to remodel a kitchen using a home equity line of credit.

The subsequent tag model (128) is a component of the content generator (124) that includes is a machine learning model. The subsequent tag model (128) generates the subsequent tag vectors (130) from the previous tags (126). The subsequent tag model (128) may use multiple machine learning methods and algorithms, including word2vec algorithms, recurrent neural network algorithms, transformer neural network algorithms, attention neural network algorithms, autoencoder algorithms, etc. In one embodiment, the subsequent tag model (128) converts the previous tag (127) to a previous tag vector, inputs the previous tag vector to a neural network, and outputs the one or more of the subsequent tag vectors (130), including the subsequent tag vector (131). The subsequent tag vectors (130) are the tag vectors for the content slot (148) and are used to identify the context for the content set (150) of the content slot (148). In one embodiment, the subsequent act model (128) may use a word2vec algorithm to convert the previous tags (126) to previous tag vectors and then input the previous tag vectors to a neural network (e.g., long short term memory, (LSTM), recurrent neural network (RNN), transformer network, etc.) that identifies the subsequent tag vector (131).

The context vector generator (132) is a component of the content generator (124) that generates the context vector (134) from the subsequent tag vectors (130). In one embodiment, the context vector generator (132) may identify the centroid of the subsequent tag vectors (131) and use the centroid as the context vector (134), which is input to the contextual bandit model (137).

The type selector (135) is a component of the content generator (124) that, using the content slot type (122) from the generation request (120), selects the contextual bandit model (137) from the contextual bandit models (136) and selects the content template set (142) from the content template sets (141). The content slot type (122) identifies the type of content to be used for the content slot (148), with each different type corresponding to one of the contextual bandit models (136) and to one of the context template sets (141). For example, when the content slot type (122) identifies that the content slot (148) is for a web page, the type selector (135) may select the contextual bandit model and the content template set for web pages (e.g., the contextual bandit model (137) and the content template set (142)).

The contextual bandit model (137) generates the selection vector (138) from the context vector (134). In one embodiment, the selection vector (138) includes a value for each content template of the content template set (142). For example, when the content slot (148) is for landing page of a website, the system may have a fixed number (7, 10, 20, etc.) of content templates that are used to generate the content set (150).

The different selection vectors, from the different contextual bandit models (136), may have different numbers of elements that correspond to the number of content templates for the types of content slots. As an example, the system may have content slots for voice interactions, emails, and web pages. The voice interactions may have three content templates, the emails may have four content templates, and the web pages may have five content templates so that the selection vector for the contextual bandit model for the voice interactions may have three elements, the selection vector for the emails may have four elements, and the contextual bandit model for the web page may have five elements.

The template selector (140) is a component of the content generator (124) that selects the content template (143) from the content template set (142). In one embodiment, the values of the elements of this selection vector (138) sum up to 1 and are used as the probability that a particular content template will be selected. For example, for a content template set with three content templates, the selection vector (138) may include the values 0.3, 0.5, and 0.2 for the three content templates. A random number is selected from between zero and one. If the random number is 0.3 or less, then the first content template is selected. If the random number is 0.8 (i.e., 0.3+0.5) or less, then the second content template is selected. Otherwise the third content template is selected.

The set generator (144) is a component of the content generator (124) that generates the content set (150) using the content template (143) and the user data (146). The content template (143) may define and identify the content blocks (152) that from the content set (150). Each of the content blocks (153) may include predetermined content and may also include dynamic content. For example, the dynamic content may identify information to be filled in, from the user profile (146), to the content block (150) three period as an example, the content block (153) may be for a web page and include the string "Hello <FIRST_NAME/>! Thanks for coming back." The substring "<FIRST_NAME/>" Is a command to the set generator (144) to retrieve the first name of the user from the user data (146) and input the first name of the user into the stream for the web page. In one embodiment, the set generator (144) may include a machine learning model that generates text for one of the content blocks using the subsequent tag vectors (130).

The content slot (148) includes the content set (150), which includes the content blocks (152). After generating the content set (150), for the content slot (148), the server application (102) may transmit the content set (150) in a response to the generation request (120).

Turning to FIG. 1B, the training application (103) is a set of components (including hardware and/or software) running on the server (101) (of FIG. 1C). The training application (103) trains the machine learning models used by the system (100) (shown in FIG. 1C). The machine learning models include the subsequent tag model (128) and the contextual bandit models (136) (of FIG. 1A), which includes the contextual bandit model (137). Each machine learning model may be trained independently of the other machine learning models or may be trained in conjunction with the other machine learning models.

The model trainer (181) and the bandit model trainers (190) are components of the training application (103). The model trainer (181) trains the subsequent tag model (128) and the bandit model trainers (190) train the contextual bandit models (136) (of FIG. 1A).

The tag model trainer (181) loads the training input (182) from the training data (109) (of FIG. 1C), executes the subsequent tag model (128) using the training input (182) to generate the training output (184), compares the training output (184) with the expected output (188) using the update function (186), and updates the subsequent tag model (128) using the update function (186).

The training input (182) may include tags from content slots of communications between the system (101) (of FIG. 1C) and multiple users. The expected output (188) may include the tag vectors of the tags of the subsequent content slots. As discussed above with regard to FIG. 1A, the subsequent tag model (128) may receive a tag of a content slot and generate tag vectors for a subsequent content slot to identify the context to be used in future communication with a user.

The update function (186) performs the comparison of the training output (184) with the expected output (188). In one embodiment, the update function (186) may update the parameters of the subsequent tag model (128) using backpropagation based on the differences between the expected output (188) and the training output (184).

The bandit model trainers (190) include the bandit model trainer (191), which trains the contextual bandit model (137) of the contextual bandit models (136) (of FIG. 1A). The bandit model trainer (191) loads the training input (192) from the training data (109) (of FIG. 1C), executes the contextual bandit model (137) using the training input (192) to generate the training output (194), compares the training output (194) to the expected output (198) using the update function (186), and updates the contextual bandit model (137) using the update function (196).

The training input (192) may include context vectors that are generated from tag vectors that are generated from the tags of content slots used with multiple users. The training output (194) may include a selection vector. The expected output (198) may include a reward vector in which each element of the reward vector identifies a content template and the reward that was received using that content template for a content slot that was used in a communication with a user. For example, the selection vector may include three elements and the reward vector would also include three elements, e.g., "[99.99, 0, 0]". The element "99.99" for the first element of the reward vector indicates that when the content template corresponding to the first element was used in a content slot, the user may have initiated a transaction for a value of "99.99".

The update function (196) performs the comparison of the training output (194) with the expected output (198). In one embodiment, the update function (196) may update the parameters of the contextual bandit model (137) using the differences between the training output (194) and the expected output (198).

In one embodiment, the machine learning models may include a neural network model that uses forward propagation to generate training outputs from the training inputs. The update functions may use backpropagation to update the weights of the neural network of the machine learning models based on the error between the training outputs and the expected outputs.

Turning to FIG. 1C, the system (100) provides for increasing user interaction with deep learning agents by training and using machine learning models to predict the context of and generate content for communications with a user. The system (100) includes the server (101), the repository (105), the developer device (112), and the user devices (116). The server (101) may include the server application (102), and the training application (103).

The server application (102) is a program on the server (101). The server application (102) includes multiple programs used by the system (100) to interact with the user devices (116) and present data to users of the system (100). The data presented to the user devices (116) includes content generated using the content data (106) formed into content blocks, content sets, and content slots. Aspects of the server application (102) are further described in FIG. 1A.

The training application (103) is a program on the server (101). The training application (103) trains the machine learning models as further described in FIG. 1B. The training application (103) may be operated or controlled by the developer device (112) with a developer application (113).

Figure 4A:
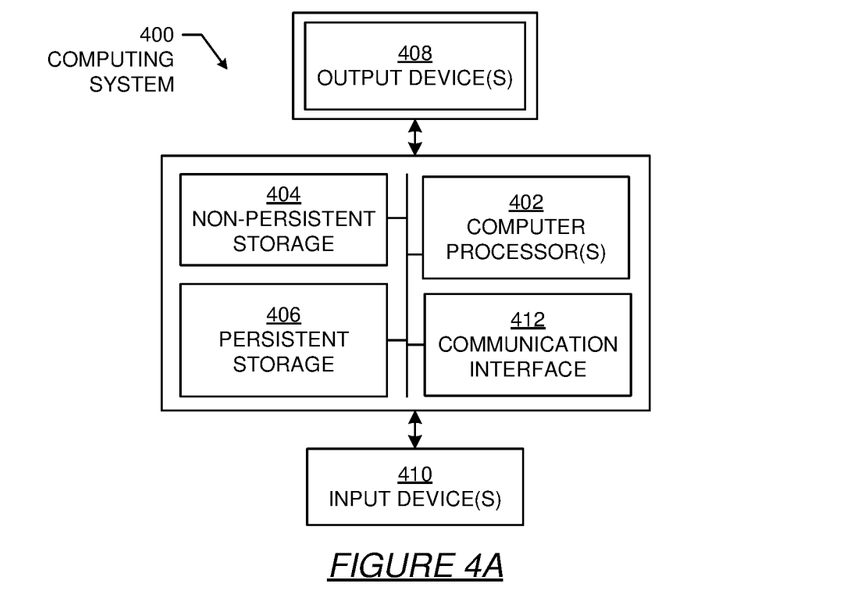
FIG. 4A and FIG. 4B show computing systems in accordance with disclosed embodiments.
Figure 4B:
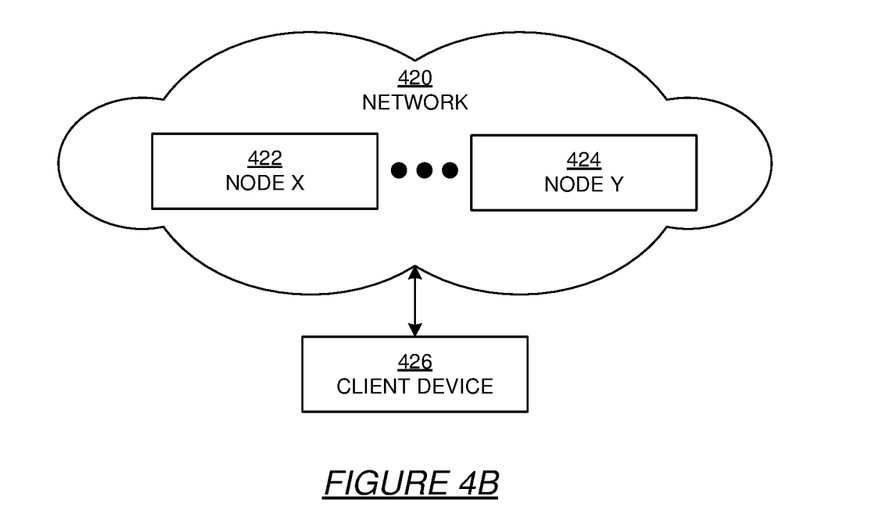

The server (101) is an embodiment of the computing system (400) and the nodes (422) and (424) of FIG. 4A and FIG. 4B. The server (101) may be one of a set of virtual machines hosted by a cloud services provider to deploy the training application (103) and the server application (102). Each of the programs running on the server (101) may execute inside one or more containers hosted by the server (101).

The repository (105) is a computing system that may include multiple computing devices in accordance with the computing system (400) and the nodes (422) and (424) described below in FIGS. 4A and 4B. The repository (105) may be hosted by a cloud services provider. The cloud services provider may provide hosting, virtualization, and data storage services as well as other cloud services to operate and control the data, programs, and applications that store and retrieve data from the repository (105). The data in the repository (105) may include the content data (106), the profile data (107), the machine learning model data (108), and the training data (109).

The content data (106) is the data used in communications with a user of the system (100). The content data (106) may include data for voice communications, email communications, web page communications, etc. In one embodiment the content data (106) may include the content slot (148) (of FIG. 1A), the content set (150) (of FIG. 1A), the content blocks (152) (of FIG. 1A), the content template (153) (of FIG. 1A), the content template sets (141) (of FIG. 1A), tags including the previous tags (126) (of FIG. 1A).

The profile data (107) is the data used to track the users of the system (100). The profile data (107) may include personally identifying information, including names (first name, last name, full name, usernames, etc.), contact information (addresses, phone numbers, email addresses, social media identifiers, etc.), interaction history, settings, preferences, etc. The interaction history may identify the content that has previously been presented to and received from a user. Information from the profile data (107) may be referenced by a content template (from the content data (106)) for inclusion into a content block of a content set of a content slot.

The machine learning model data (108) may include the code and data that form the machine learning models used by the system, which may include the machine learning models used by the server application (102) (which may include the subsequent tag model (128) and the contextual bandit models (136) of FIG. 1A) and trained by the training application (103) (including the update functions (186) and (196) of FIG. 1B). The parameters and weights of the models used by the system (100) may be part of the machine learning model data (108).

The training data (109) is the data used to train the machine learning models of the system (100). The training data (109) may include the training inputs and expected outputs from FIG. 1B and include intermediate data. The intermediate data may be generated by the machine learning models during the use of the machine learning models. For example, the intermediate data may include the subsequent tag vectors (130) (of FIG. 1A), the context vector (134) (of FIG. 1A), the selection vector (138) (of FIG. 1A), etc. Each model used by the system (100) may have a particular set of data in the training data (109) that includes the specific type of input data for the model and the specific type of expected output for the model.

The data in the repository (105) may also include a web page (111) that is part of a website hosted by the system (100). The users and the developers may interact with the website using the user devices (116) and the developer device (112) to access the server application (102) and the training application (103).

The developer device (112) is an embodiment of the computing system (400) and the nodes (422) and (424) of FIG. 4A and FIG. 4B. In one embodiment, the developer device (112) is a desktop personal computer (PC). The developer device (112) includes the developer application (113) for accessing the training application (103). The developer application (113) may include a graphical user interface for interacting with the training application (103) to control training and updating the machine learning models of the system (100).

The user devices (116), including the user device (114), are embodiments of the computing system (400) and the nodes (422) and (424) of FIG. 4A and FIG. 4B. Each user may use multiple different devices to access the system (100). The user devices (116) may be a desktop personal computer (PC), a smartphone, a tablet, etc. The user device (114) is used to access the web page (111) of the website hosted by the system (100). The user device (114) includes the user application (115) for accessing the server application (102). The user application (115) may include multiple interfaces (graphical user interfaces, application program interfaces (APIs)) for interacting with the server application (102). A user may operate the user application (115) to perform tasks with the server application (102) to interact with the system (100). The results may be presented by being displayed by the user device (114) in the user application (115).

The developer application (113) and the user application (115) may be web browsers that access the server application (102) and the training application (103) using web pages hosted by the server (101). The developer application (113) and the user application (115) may additionally be web services that communicate with the server application (102) and the training application (103) using representational state transfer application programming interfaces (RESTful APIs). Although FIG. 1C shows a client server architecture, one or more parts of the training application (103) and the server application (102) may be local applications on the developer device (112) and the user devices (116) without departing from the scope of the disclosure.

Figure 2A:
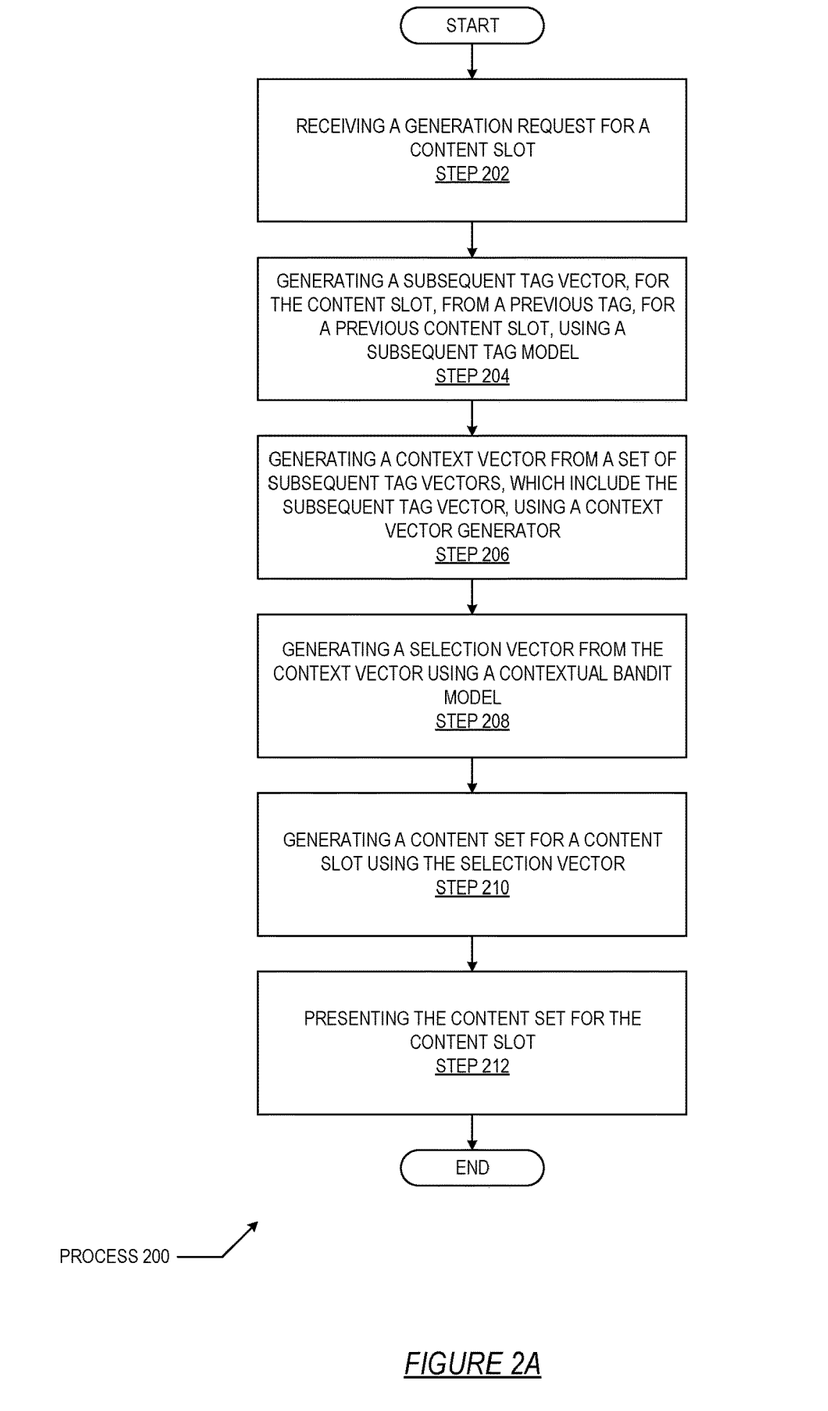
FIG. 2A and FIG. 2B show flowcharts in accordance with disclosed embodiments.
Figure 2B:
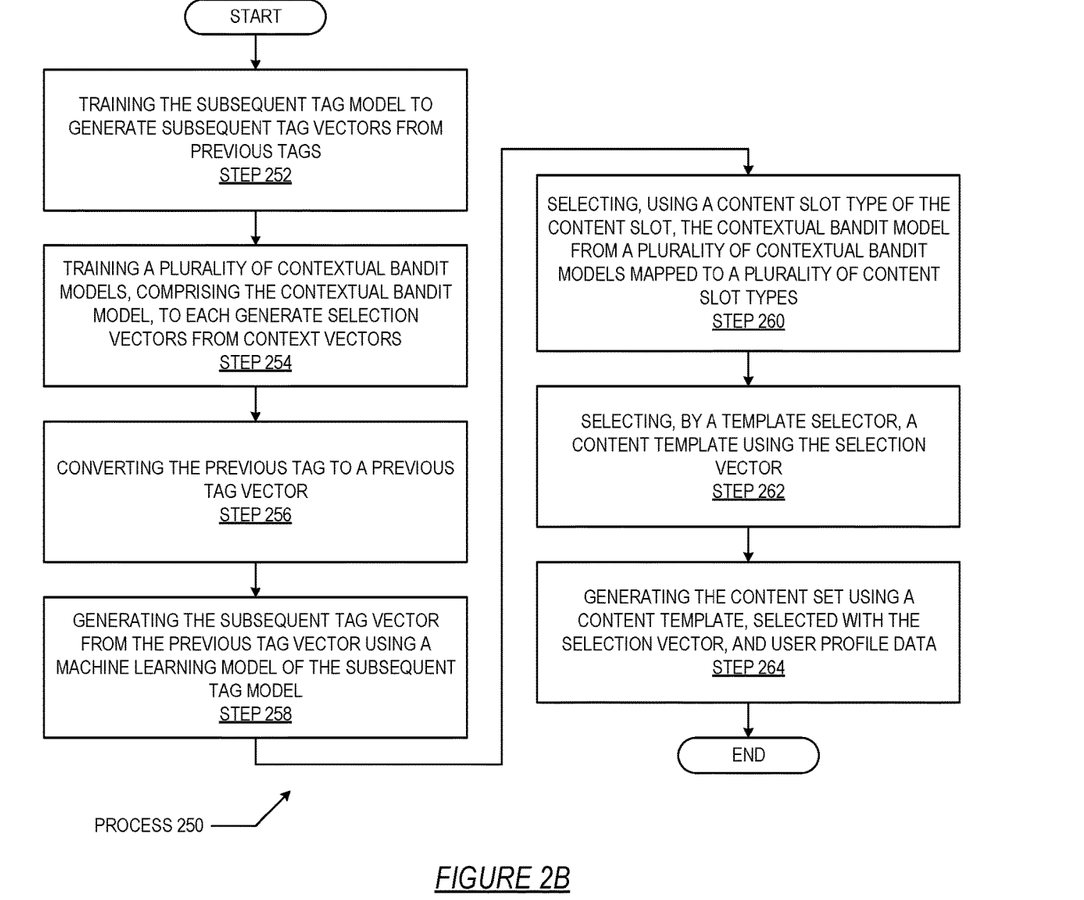

FIGS. 2A and 2B show flowcharts of processes in accordance with the disclosure. The process (200) of FIG. 2A uses machine learning models to generate content for user interaction. The process (250) of FIG. 2B trains and uses machine learning models to generate content for user interaction. The embodiments of FIGS. 2A and 2B may be combined and may include or be included within the features and embodiments described in the other figures of the application. The features of FIGS. 2A and 2B are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) may operate on a server as part of a server application. The process (200) presents content in response to a generation request.

At Step 202, a generation request for a content slot is received. In one embodiment, the generation request may be received in response to an action from a user. For example, the user may initiate a voice communication (e.g., a phone call) with the system or use a browser to request a web page from the system. In one embodiment, the system may initiate the generational request. For example, after a voice communication or a web session (that requested the web page), the system may follow up with the user with an email. A predetermined time period may be used, which may be a day, a week, etc.

At Step 204, a subsequent tag vector, for the content slot, is generated from a previous tag, for a previous content slot, using a subsequent tag model. The previous tag corresponds to the previous content slot and identifies context of the previous content slot. In one embodiment, the content slot includes a content slot type that is different than a previous content slot type of the previous content slot. The subsequent tag vector identifies context for a subsequent content slot. In one embodiment, the subsequent type vector may be generated from the previous tag using a neural network model.

At Step 206, a context vector is generated from a set of subsequent tag vectors, which include the subsequent tag vector, using a context vector generator. The context vector may be generated using a context vector generator. In one embodiment, the context vector generator may identify the centroid but the subsequent tag vectors to use as the context vector.

At Step 208, a selection vector is generated from the context vector using a contextual bandit model. The contextual bandit model receives the context vector and generates the selection vector. The contextual bandit model may apply a contextual bandit algorithm to the context vector using the parameters of the contextual bandit model to generate the selection vector.

At Step 210, a content set is generated for a content slot using the selection vector. The content set may be generated by a server application by identifying a collection of content blocks and customizing the content blocks based on information from the user profile.

At Step 212, the content set for the content slot is presented. In one embodiment, the contact set is presented by transmitting the content set from the server application to a user application, which displays the content set.

Turning to FIG. 2B, the process (250) may operate on a server as part of a server application. The process (250) trains and uses machine learning models.

At Step 252, the subsequent tag model is trained to generate subsequent tag vectors from previous tags. The subsequent tag model may include a neural network model that uses forward propagation to generate the subsequent tag vectors and back propagation to update the parameters of the model.

At Step 254, contextual bandit models are trained to generate selection vectors from context vectors. A contextual bandit model may be trained for each content slot type. Different contexts slot types may have different numbers of context templates that are used for generating content sets for the content slots.

At Step 256, the previous tag is converted to a previous tag vector. In one embodiment, the previous tag vector may be a one hot vector with a number of dimensions equal to the number of different tags used by the system. One element of the one hot vector is set to 1 (with the remaining elements set to 0) to identify an individual tag.

At Step 258, a subsequent tag vector is generated from the previous tag vector using a machine learning model of the subsequent tag model. The machine learning model may be a recurrent neural network model, a transformer neural network model, an attention neural network model, etc., that operates on the sequence of tag vectors from recent content slots. As an example, when the two previous content slots that were most recently sent each include three tags, a sequence of six tags may be input to the neural network. Longer sequences may be used. The tags for the first content slot, which was communicated before the second content slot, may appear in the sequence before the tags for the second content slot.

At Step 260, a contextual bandit model is selected, using a content slot type of the content slot, from multiple contextual bandit models that are mapped to the different content slot types. The contextual bandit models may be mapped to the content slot types in a one to one correspondence.

At Step 262, a content template is selected using the selection vector. The content template may be selected using a template selector. In one embodiment, the content template is selected using a random number and values from a selection vector. The values are probabilities used to select the content template from a group of content templates mapped to the probabilities.

At Step 264, a content set is generated using a content template and user profile data. In one embodiment, the content template is selected with the selection vector. After identifying the content template, the set generator may locate content blocks that correspond to the content template and update data within the content blocks with information from a user profile.

Figure 3:
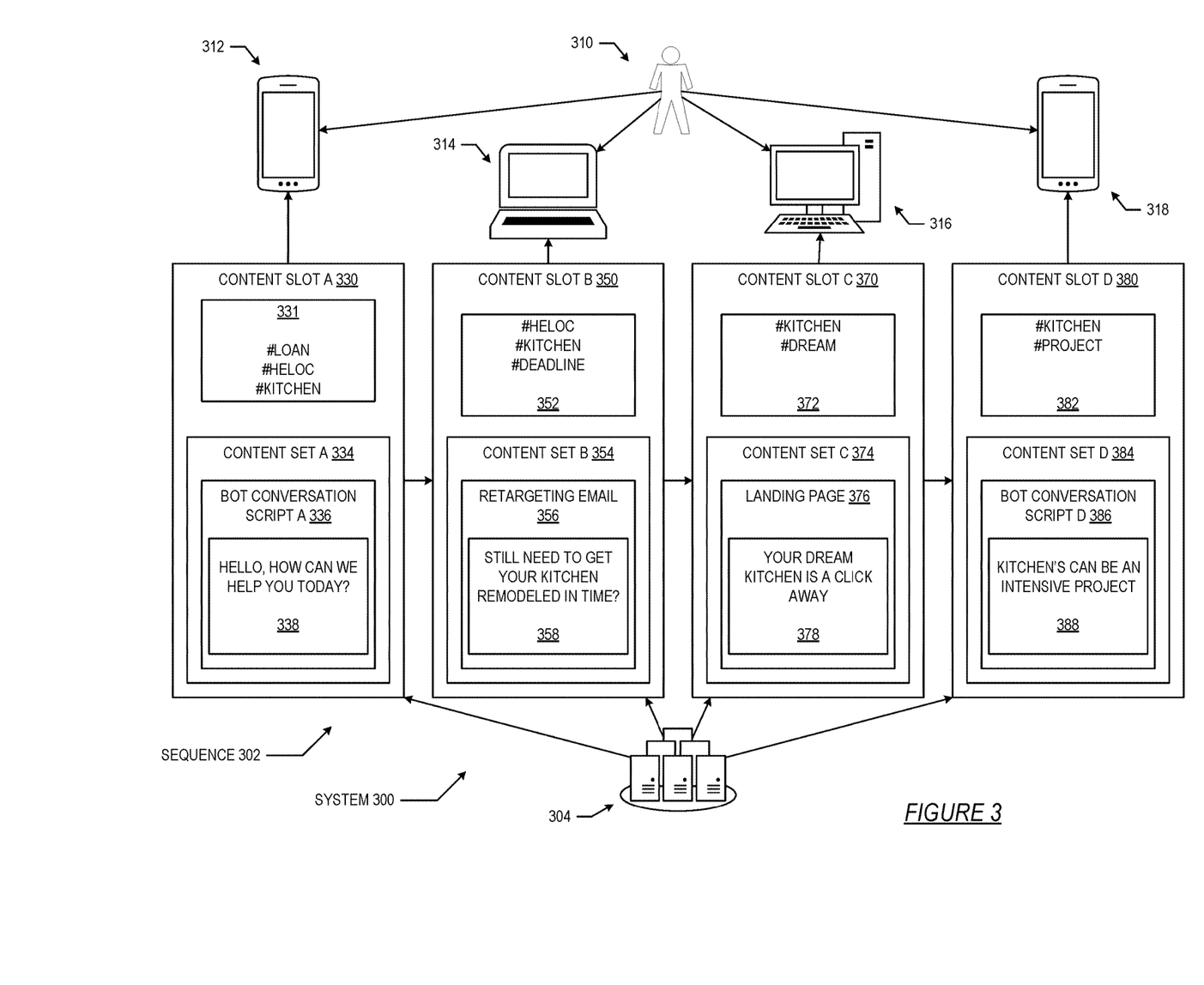
FIG. 3 shows examples in accordance with disclosed embodiments.

FIG. 3 shows examples of systems and methods that increase user interaction with a deep learning agent. The embodiments shown in FIG. 3 may be combined and may include or be included within the features and embodiments described in the other figures of the application. The features and elements of FIG. 3 are, individually and as a combination, improvements to the technology of computing systems and machine learning systems. The various features, elements, widgets, components, and interfaces shown in FIG. 3 may be omitted, repeated, combined, and/or altered as shown. Accordingly, the scope of the present disclosure should not be considered limited to the specific arrangements shown in FIG. 3.

Turning to FIG. 3, the system (300) may be an embodiment of the system (100) of FIG. 1 and performs the sequence (302) between the servers (304) and the user devices (312), (314), (316), and (318) of the user (310). The sequence (302) includes the content slots A (330), B (350), C (370), and D (380). The content slots A (330), B (350), C (370), and D (380) comprise the contents of the communication from the servers (304) to the user devices (312), (314), (316), and (318) of the user (310). The servers (304) execute one or more instances of a server application (an example of which is shown in FIG. 1A) to generate the content slots A (330), B (350), C (370), and D (380).

For the content slot A (330), the user (310) may initiate contact with the servers (304) by initiating a voice communication (e.g., a phone call) with the user device (312) (a smartphone). In response to initiation of the voice communication, a server application executing on one of the servers (304) may generate the content slot A (330), which is transmitted to the user device (312).

The content slot A (330) includes the tags (331). In one embodiment, the content slot A (330) corresponds to the initial contact from the user (310) to the system (300). The tags (331) may be assigned to the content slot A (330) after the conversation has been completed and may be extracted from a transcript of the conversation between the user (310) and the system (300).

The content slot A (330) includes the content set A (334) with the bot conversation script A (336). The bot conversations script A (336) includes the content block (338) with the text "hello, how can we help you today?". When the content slot A (330) is for the initial communication to the user, there may be no previous tags to input to the subsequent tag model of the content generator for the server application. The system (300) may include contextual bandit models and content template sets for initial communications with the user. For the initial communication, the system (300) may use a default context vector to generate the selection vector from a contextual bandit model and bypass the subsequent tag model. After the selection vector is generated with the contextual bandit model from the default context vector, the template selector identifies a content template to use for the initial bot conversation script A (336). The content template may include the content block (338).

The content slot B (350) includes the content set B (354) with the retargeting email (356). The retargeting email (356) includes the content block (358) with the text "still need to get your kitchen remodeled in time".

The content slot B (350) may be generated by the system (300) in response to a timer initiated after the communication corresponding to the content slot A (330) is completed. The timer may trigger the generation request for the content slot B (350) that initiates the content generator. For example, the system (300) may generate the content slot B (350) for a follow up email on a day or week after completion of the communication corresponding to the content slot A (330). After the timer completes, the generation request is triggered and the system generates the content slot B (350).

The content slot B (350) occurs after the content slot A (330) and after the tags (331) have been assigned to the content slot A (330). The content generator retrieves the tags (331) (previous tags) of the content slot A (330) and inputs the tags (331) to the subsequent tag model. The subsequent tag model is used to generate one or more subsequent tag vectors. The previous tags include the tag "#kitchen" and the subsequent tag model generates one or more subsequent tag vectors, one of which may correspond to the tag "#kitchen". The subsequent tag vectors identified with the subsequent tag model may then be converted to the tags (352), which include the tag "#kitchen", and are used to generate the content set B (354).

The tag vectors (corresponding to the tags (352)) are input to the context vector generator, which generates a context vector. The context vector is input to a contextual bandit model that is selected for the content slot type of the content slot B (350), which was identified in the generation request. The type of communication is an email (i.e., a retargeting email). The contextual bandit model outputs a selection vector that is used by a template selector.

The template selector uses the selection vector to select a content template from a content template set for the content slot type (an email). After selecting the content template, a set generator takes the content template and user data to generate the content set B (354), which includes the retargeting email (356) and the content block (358).

In one embodiment, the content template set may include content templates for different types of projects. One type of project is kitchen remodeling, which may have a particular content template (or group of content templates) that define content blocks that include the content block (358). The contextual bandit model generates the selection vector based on the context vector generated from the tags (352) and based on the previous tags (331). The set generator generates the retargeting email (356), including the content block (358), from the selected content template and the user data. After generating the retargeting email (356), one of these servers (304) may send the retargeting email (356) to the user (310). The user (310) may open the retargeting email (356) with the user device (314) (a laptop).

The sequence (302) proceeds to construct content slot C (370) after constructing and communicating the content slot B (350) and in response to a generation request. The generation request corresponds to a web page request from the user device (316) (e.g., a desktop computer) for a website hosted by the servers (304) of the system (300). For example, the user may have clicked on a link, from the retargeting email (356), that quests the landing page (376).

The system (300) identifies the previous tags (331) and (352), which are input to the subsequent tag model to generate tag vectors that correspond to the tags (372). The tag vectors for the tags (372) are used to generate a context vector that is input to a contextual bandit model. The contextual bandit model is selected for the content slot type of the content slot C (370) (a page of a website, i.e., the landing page (376)) based on the content slot type identified in the generation request for the content of slot C (370).

A selection vector, generated by the contextual bandit model from a context vector, is used by a template selector to identify a content template from a content template set. The content template that is selected defines the landing page (376) and the content blocks within the landing page (376), including the content block (378) with the text "your dream kitchen is a click away". After generating the landing page (376), the servers (304) may send the landing page (376) in response to the access request from the user device (316).

The sequence (302) proceeds to generate the content slot D (380). The content slot D (380) is another voice communication (e.g., a conversation with a bot hosted by one of these servers (304)). For example, after viewing the landing page (376), the user (310) may use the user device (318) (a different smartphone of the user (310)) to communicate with the system (300) (e.g., to apply for loan for kitchen remodeling).

The system (300) identifies the previous tags (331), (352), and (372), which are input to the subsequent tag model to generate tag vectors that correspond to the tags (382). The tag vectors for the tags (382) are used to generate a context vector, which is used to generate a selection vector with a contextual bandit model. The contextual bandit model is selected based on the content slot type (a voice communication) identified in the generation request.

A template selector uses the selection vector and a content template set to identify a content template that defines the bot conversation script D (386). After identifying the content template, the system (300) generates the content set D (384) to include the bot conversation script D (386). The bot conversation script D (386) includes the content block (388). The content block (388) includes the text "kitchen's can be an intensive project", which may be spoken to the user as part of a bot conversation.

Embodiments of the invention may be implemented on a computing system specifically designed to achieve an improved technological result. When implemented on a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving a generation request for a content slot;
    generating a subsequent tag vector, for the content slot, from a previous tag, for a previous content slot, using a subsequent tag model;
    generating a context vector from a set of subsequent tag vectors, which include the subsequent tag vector, using a context vector generator;
    generating a selection vector from the context vector using a contextual bandit model;
    generating a content set for the content slot using the selection vector and a content template, wherein generating the content set comprises:
        selecting the content template using a random number and a plurality of values from the selection vector, wherein the plurality of values is a plurality of probabilities used to select the content template from a plurality of content templates mapped to the plurality of probabilities; and
    presenting the content set for the content slot.

2. The method of claim 1, further comprising:
    converting the previous tag to a previous tag vector; and
    generating the subsequent tag vector from the previous tag vector using a machine learning model of the subsequent tag model.

3. The method of claim 1, wherein generating the content set further comprises:
   selecting, by a template selector, the content template using the selection vector.

4. The method of claim 1, wherein generating the content set further comprises:
   generating the content set using the content template, selected with the selection vector, and user profile data.

5. The method of claim 1, further comprising:
   selecting, using a content slot type of the content slot, the contextual bandit model from a plurality of contextual bandit models mapped to a plurality of content slot types, wherein the plurality of content slot types include the content slot type, and wherein the plurality of contextual bandit models are mapped to the plurality of content slot types with a one to one correspondence.

6. The method of claim 1, wherein the content slot comprises a content slot type that is different than a previous content slot type of the previous content slot.

7. The method of claim 1, further comprising:
   training the subsequent tag model to generate the subsequent tag vector from the previous tag.

8. The method of claim 1, further comprising:
   training a plurality of contextual bandit models, comprising the contextual bandit model, to each generate selection vectors from context vectors.

9. A system comprising:
   a server comprising one or more processors and one or more memories; and
   a server application, executing on the one or more processors of the server, configured for:
     receiving a generation request for a content slot,
     generating a subsequent tag vector, for the content slot, from a previous tag, for a previous content slot, using a subsequent tag model,
     generating a context vector from a set of subsequent tag vectors, which include the subsequent tag vector, using a context vector generator,
     generating a selection vector from the context vector using a contextual bandit model,
     generating a content set for the content slot using the selection vector and a content template, wherein generating the content set comprises:
       selecting the content template using a random number and a plurality of values from the selection vector, wherein the plurality of values is a plurality of probabilities used to select the content template from a plurality of content templates mapped to the plurality of probabilities, and
     presenting the content set for the content slot.

10. The system of claim 9, wherein the server application is further configured for:
    converting the previous tag to a previous tag vector; and
    generating the subsequent tag vector from the previous tag vector using a machine learning model of the subsequent tag model.

11. The system of claim 9, wherein generating the content set further comprises:
    selecting, by a template selector, the content template using the selection vector.

12. The system of claim 9, wherein generating the content set further comprises:
    generating the content set using the content template, selected with the selection vector, and user profile data.

13. The system of claim 9, wherein the server application is further configured for:
    selecting, using a content slot type of the content slot, the contextual bandit model from a plurality of contextual bandit models mapped to a plurality of content slot types, wherein the plurality of content slot types include the content slot type, and wherein the plurality of contextual bandit models are mapped to the plurality of content slot types with a one to one correspondence.

14. The system of claim 9, wherein the content slot comprises a content slot type that is different than a previous content slot type of the previous content slot.

15. The system of claim 9, further comprising:
    training the subsequent tag model to generate the subsequent tag vector from the previous tag.

16. The system of claim 9, further comprising:
    training a plurality of contextual bandit models, comprising the contextual bandit model, to each generate selection vectors from context vectors.

17. A method comprising:
    training a subsequent tag model to generate a subsequent tag vector from a previous tag;
    training a plurality of contextual bandit models, comprising a contextual bandit model, to each generate selection vectors from context vectors;
    generating the subsequent tag vector, fora content slot, from the previous tag, for a previous content slot, using the subsequent tag model;
    generating a context vector from a set of subsequent tag vectors, which include the subsequent tag vector, using a context vector generator;
    generating a selection vector from the context vector using the contextual bandit model; and
    generating a content set for the content slot using the selection vector and a content template, wherein generating the content set comprises:
      selecting the content template using a random number and a plurality of values from the selection vector, wherein the plurality of values is a plurality of probabilities used to select the content template from a plurality of content templates mapped to the plurality of probabilities.

18. The method of claim 17, further comprising:
    converting the previous tag to a previous tag vector; and
    generating the subsequent tag vector from the previous tag vector using a machine learning model of the subsequent tag model.

\* \* \* \* \*